US005116067A

United States Patent [19]

Johnson

[11] Patent Number: 5,116,067

[45] Date of Patent: May 26, 1992

[54] CONVERTIBLE CHAIR SUPPORT FOR DISABLED PERSONS

[76] Inventor: John M. Johnson, 4239 W. Lawrence La., Phoenix, Ariz. 85051

[21] Appl. No.: 607,812

[22] Filed: Nov. 1, 1990

[51] Int. Cl.[5] .......... B62B 19/04

[52] U.S. Cl. .......... 280/7.14; 280/7.15; 280/14.1; 280/250.1; 280/270; 280/304.1; 280/92; 297/DIG. 4

[58] Field of Search .......... 280/250.1, 304.1, 7.15, 280/7.14, 92, 282, 288.1, 270, 274, 278, 288.3, 14.1, 266; 180/332; 297/DIG. 4

[56] References Cited

U.S. PATENT DOCUMENTS

| | | | |
|---|---|---|---|
| 217,241 | 7/1879 | Ruggles | 280/92 X |
| 222,210 | 12/1879 | Steves | 280/92 |
| D. 305,318 | 1/1990 | Danecker | D12/131 |
| 871,642 | 11/1907 | Sellstone | 280/14.2 X |
| 1,563,401 | 12/1925 | Rousseau | 280/92 X |
| 1,667,436 | 4/1928 | Rainey | 280/14.2 |
| 2,596,055 | 5/1952 | Thomas | 280/304.1 |
| 4,365,924 | 12/1982 | Brigman et al. | 280/304.1 X |
| 4,470,610 | 9/1984 | Wilson | 280/7.14 X |
| 4,500,102 | 2/1985 | Haury et al. | 280/304.1 |
| 4,537,412 | 8/1985 | Hill | 280/14.1 X |
| 4,865,572 | 9/1989 | Andes | 280/14.1 X |

FOREIGN PATENT DOCUMENTS

| | | | |
|---|---|---|---|
| 2716962 | 10/1978 | Fed. Rep. of Germany | 280/304.1 |
| 3539455 | 5/1987 | Fed. Rep. of Germany | 280/250.1 |

*Primary Examiner*—Andres Kashnikow
*Assistant Examiner*—Michael Mar
*Attorney, Agent, or Firm*—Don J. Flickinger; Jordan M. Meschkow; Lowell W. Gresham

[57] ABSTRACT

A support structure for disabled persons that can be adapted to attach standard wheelchair wheels for providing mobility to the disabled person while allowing interchanging accessories to change the support structure for use in sporting events such as racing and water or snow skiing. The support structure includes a cushioned member adjustably attached to a single piece elongated frame. The frame and the member include upwardly depending sides. The frame includes slots and holes to attach a propellable wheelchair wheel at the standard position and at a racing position. A steering structure is included for operation while racing. Sockets are formed in the frame to attach the pivot wheels of the wheelchair and to attach water and snow-skis to the support structure to replace the wheels.

20 Claims, 4 Drawing Sheets

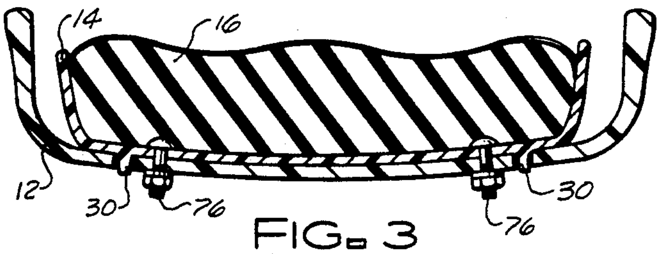
FIG. 3
FIG. 4
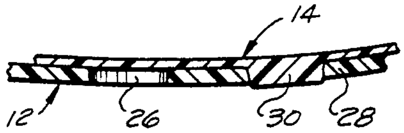
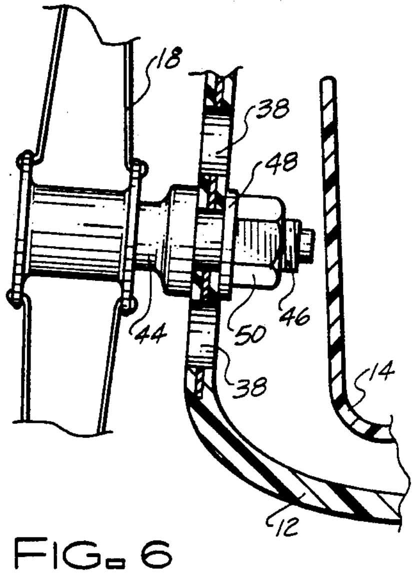
FIG. 6
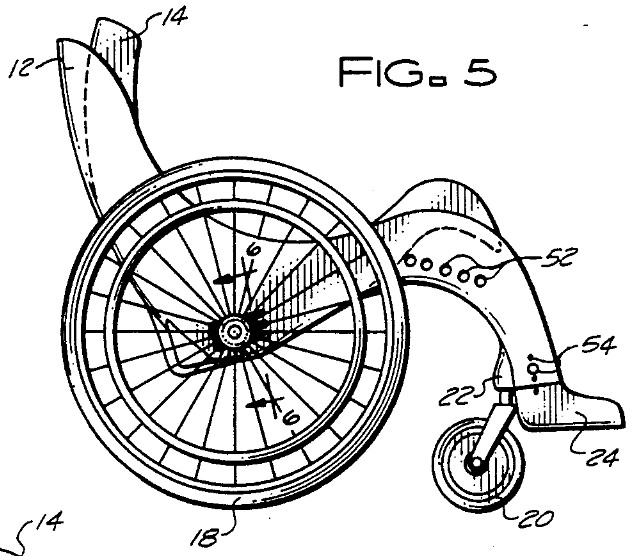
FIG. 5
FIG. 7
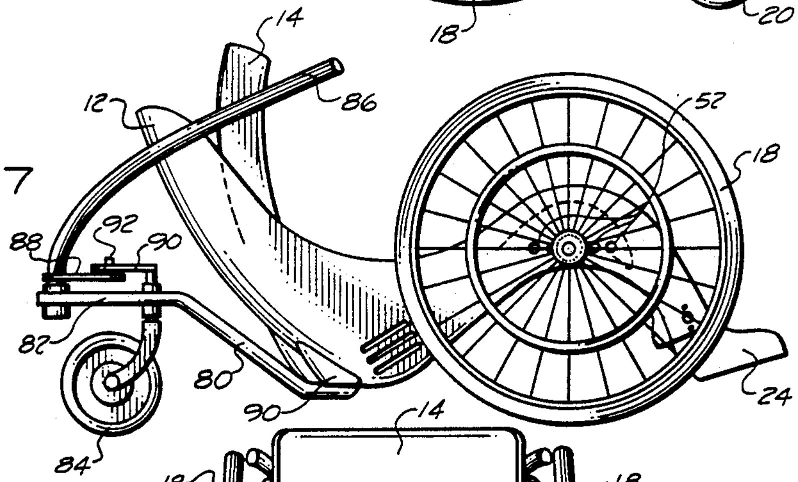
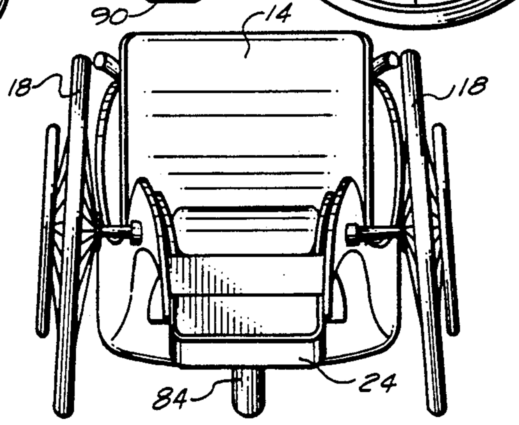
FIG. 8

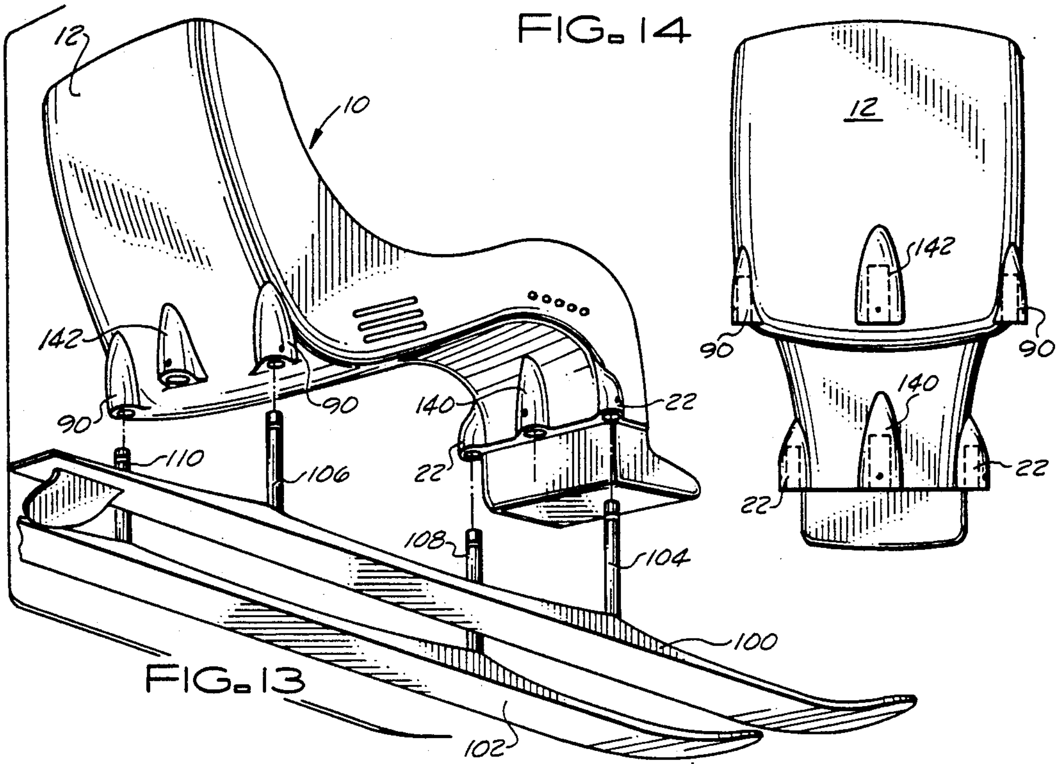
FIG. 13
FIG. 14
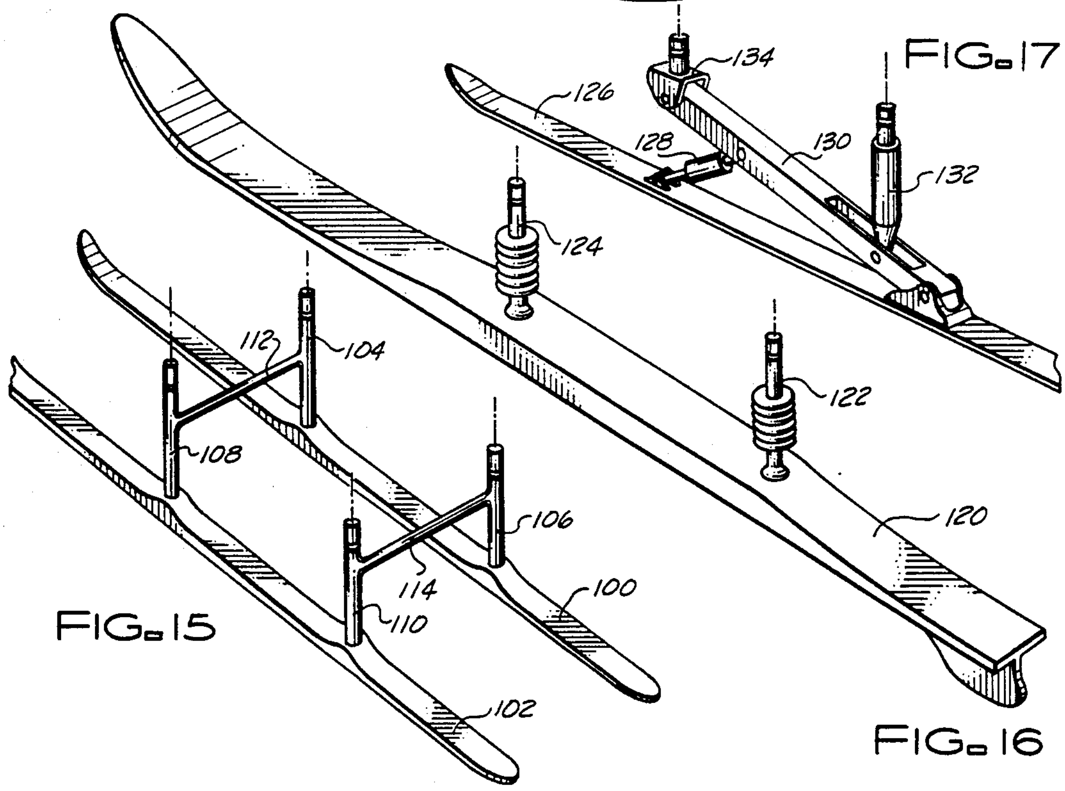
FIG. 17
FIG. 16
FIG. 15

CONVERTIBLE CHAIR SUPPORT FOR DISABLED PERSONS

BACKGROUND OF THE INVENTION

1. Field of the Invention

This invention relates generally to a chair support structure for invalids and more particularly to a chair support structure that is adaptable and adjustable to operate as a standard wheelchair while permitting conversion to allow the occupant to change the support structure into a racing vehicle or to participate in snow or water skiing events.

2. Prior Art

The wheelchair in standard use by humans who do not have the capability of transporting themselves is well known. The standard wheelchair includes a pair of large rotatably mounted wheels and a pair of smaller rotatable and pivotable wheels. The larger wheels are placed adjacent to the arms of the occupant of the wheelchair to permit the occupant to propel the wheelchair along the ground. Prior art wheelchairs were single purpose with few adjustments and are generally purchased in a size to conform to the future occupant. The prior art wheelchair limited the uses to which the wheelchair could be placed and thereby limited the participation of the occupant in sporting events.

It is, therefore, an object of the present invention to provide an enhanced support structure for disabled persons.

Another object of the present invention is to provide a versatile support structure that is adaptable to change the wheel and steering structure of the support structure.

Yet another object of the present invention is to provide a support structure for disabled persons that permits the support structure to be used as a wheeled vehicle while adaptable to replace the wheels with skis to permit water and/or snow skiing by the disabled person.

Still another object of the present invention is to permit the wheelchair to be changed to a racing styled vehicle that is steerable by the occupant of the wheelchair.

SUMMARY OF THE INVENTION

In accordance with the present invention, a support structure for disabled persons includes a member having a generally chair-like form that is curved to conform to the body of the disabled person. The member includes a continuous back, seat and upper leg support sections and upstanding sides that follows the curved form of the chair to hold the disabled person. A frame generally curved to conform to the member also includes upstanding sides following its curved form. Means are provided to adjustably fasten the member to the frame structure to permit changing the relative position of the member to the frame. A resilient cushioning means is removably attached to the member to confortably support the disabled person in the member. The frame includes various openings and slots to permit exchanging the support structure for the frame. Standard wheelchair wheels can be mounted and adjustably positioned to the frame. Further, the wheelchair wheels can be placed into the racing position at the upper leg section of the member and rotatably attached to the frame for propelling the support structure by the occupant of the member. A steering assembly can then be mounted through a bracket connected through the frame rearward of the occupant. A steering assembly can pivot the single wheel to permit steering while the occupant propels the support structure.

It is, therefore, an object of the present invention to provide an enhanced wheelchair assembly.

Another object of the present invention is to provide an improved apparatus that permits a single design to be useful as a standard wheelchair for disabled persons while permitting adaptability to change the structure to permit the usage for sports activities.

Yet another object of the present invention is to provide a frame structure that can be adapted for a standard wheelchair construction while adaptable to change the seating member relative to the frame structure to permit adaptability of the structure for sports purposes.

These and other objects of the present invention will become apparent to those skilled in the art as the description proceeds.

BRIEF DESCRIPTION OF THE DRAWINGS

The various novel features of this inventions along with the foregoing and other objects, as well as the invention itself both as to its organization and method of operation, may be more fully understood from the following description of illustrated embodiments when read in conjunction with the accompanying drawing, wherein:

FIG. 3 is a cross-section view taken along lines 3—3 of FIG. 1 showing the interconnection of the structure according to the present invention;

FIG. 4 is a cross-sectional view taken along lines 4—4 of FIG. 2 showing the adjustable relationship of the structure;

FIG. 5 is a side view of the wheelchair as shown in FIG. 1;

FIG. 6 is a cross-sectional view taken along lines 6—6 of FIG. 5 showing the adjustable attachment of the wheel to the structure;

FIG. 7 shows the interconnection of the structure as shown in FIG. 2 with the wheels attached to provide a racing sport structure adaptable from the present invention;

FIG. 8 shows the front view of the racing structure as shown in FIG. 7;

FIG. 13 is a perspective view showing the interconnection of the water-skis to the structure according to the present invention as shown in FIG. 12;

FIG. 14 is a back view showing the interconnecting receptacles of the structure according to the present invention as adapted to the water-skis as shown in FIG. 13;

FIG. 15 shows a perspective top view of an embodiment of the water-skis for use with the structure of the present invention as shown in FIG. 13;

FIG. 16 shows an embodiment of a ski structure as shown in FIG. 13 as adapted to the present invention with shock absorbing means; and FIG. 17 shows a further embodiment of a shock absorber assembly as adapting skis to the present invention as shown in FIG. 13.

DESCRIPTION OF THE PREFERRED EMBODIMENT

In the preferred embodiment, the present invention provides an improved wheelchair assembly with a support structure that permits altering the position of the wheel structure such that the assembly can be adapted for use as a standard wheelchair to permit the disabled person to transport themselves over flat ground while permitting repositioning of the wheels and adding accessories to permit the structure for the disabled persons to be adaptable for use for sports such as racing or water or snow skiing. The support structure according to the embodiments of the present invention permit adjustably supporting the body of the disabled person relative to a motion permitting assembly. The large wheels of a standard wheelchair are adjustable to permit height changes to adjust to the body of the occupant of the structure to permit the disabled person to easily propel themselves by placing the wheels in a comfortable relationship to the disabled person. The standard wheelchair wheels can also be changed to mount the wheels adjacent to the knees of the disabled persons and by adding a bracket and a steering assembly to mount one of the pivotable front wheels rearward to the assembly. The seating structure can be thereby changed to permit the disabled person to comfortably propel the support structure while the disabled person uses his upper body to alter the pivoting of the rear wheel for steering purposes The frame of the support structure includes openings to adapt the support structure for dual skis or a singular ski support to permit the disabled person to use his wheelchair support structure for the sport of skiing, either through water or over snow. Shock absorber assemblies are further shown which will aid the comfort of the disabled person while skiing.

Figure 1:
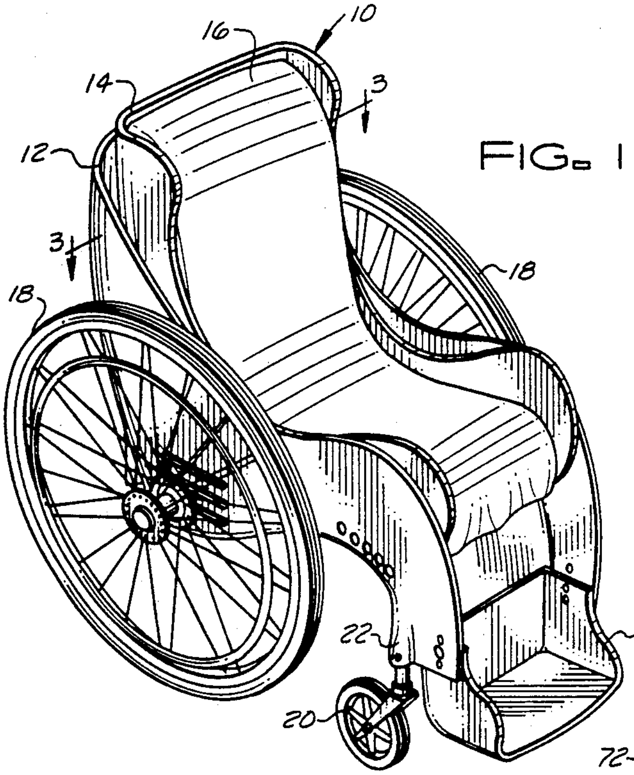
FIG. 1 is a perspective view showing the present invention as adapted to a standard wheelchair construction.
Figure 2:
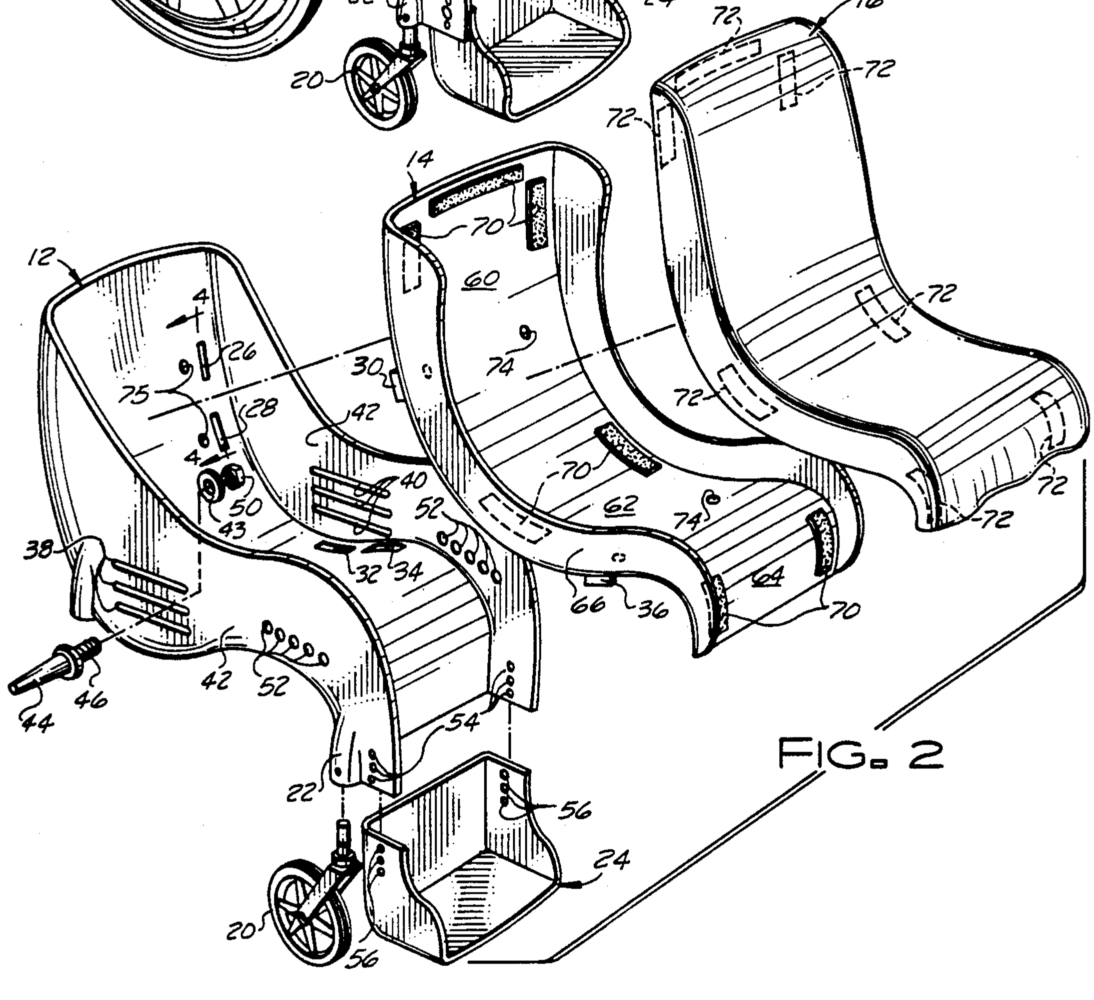
FIG. 2 is an exploded view of the structure for use in the present invention.

Referring now to the drawing and especially to FIG. 1, a support structure 10 for a disabled person includes a frame 12, a member 14, and a resilient cushioning means 16. The same reference numerals are used throughout the Figs. to show the same structure as adapted to the different motion permitting devices useful with the present invention. Standard propelling wheelchair wheels 18 are shown rotatably attached to the frame 12. A pair of pivotable and rotatable wheels 20, one shown in FIG. 1, is shown attached to the frame 12 through sockets 22. A foot rest 24 is adjustably attached to the frame 12 to support the feet of the occupant of the disabled person support structure 10. FIG. 2 shows the interaction of the portions of this invention.

In FIG. 2, the disabled person support structure shows the adjustable interaction of the chair-like member 14 as it relates to the frame 12. The frame 12 includes elongated slots 26 and 28 which interact with tabs 30 of the member 14 to permit the adjustment of the member 14 relative to the frame 12. Further slots 32 and 34 interact with tabs 36 connected at the seat portion of the member 14. A further description of the interaction of the slots 26, 28, 32 and 34 and their interaction with tabs 30 and 36 is shown in FIGS. 3 and 4 and will be further described later. A plurality of elongated slots 38 and 40 are shown in both sides 42 of the frame 12. The propelling wheels 18, see FIG. 1, are interconnected with the sides 42 of the frame 12 through the slots 38 and 40 for adjustably positioning the propelling wheels 18 relative to the occupant of the disabled person support structure 10. As shown in FIG. 2, a hub 44 of the propelling wheel 18 includes a threaded portion 46. The threaded portion 46 is passed into the openings of the elongated slots 38 and 40, and the propelling wheel 18 is held to the sides 42 of the frame 12 through a washer 48 and nut 50 which are passed over the threaded portion 46 to hold the entire propelling wheel 18 to the support structure. By placing the threaded portion 46 into any one of the elongated slots and positioning the wheel assembly along any of the elongated slots, the support structure can be adjusted for height as well as placing the propelling wheel 18 into many positions relative to any occupant of the support structure 10.

Still referring to FIG. 2, the sides 42 of the frame 12 further includes a plurality of through holes 52 formed through the sides 12 adjacent to the knees of the occupant of the support structure. The holes 52 will be described further later with an embodiment of the present invention as shown in FIG. 7. Further holes 54 are provided in the sides 42 of the frame 12 adjacent to the leg portions of the occupant of the support structure. The holes 54 adapt to holes 56 in the footrest 24. By the judicious use of any one of the three holes 54 or any one of the three holes 56, the footrest 24 can have nine adjustable heights to permit conformity of the support structure 10 to the disabled person occupant.

The member 14 shown in FIG. 2 has a generally chair-like form curved to conform to the body of the human with a continuous back section 60, a seat section 62 and an upper leg support section 64. Upstanding sides 66 and 68 are formed from the continuous section to provide a single piece construction. Means such as Velcro ® strips 70 conformed to like attaching means, i.e. Velcro ® strips 72 on the resilient cushioning means 16. Holes are provided in the member 14 at reference numerals 74, two of the four shown, for attachment of the member 14 to the frame 12 as will be further discussed in FIG. 3. The resilient cushioning means or member 16 can be made of a plastic foam formed to the configuration of the member 14 and covered by a plastic or a cloth material. The cushioning member 16 can be made of a thermal material if used for snow skiing or a waterproof material if used for water-skiing as will be discussed later. The cushioning member 16 may be made of a flotation material as an extra safety factor when the embodiment of the present invention is used for water skiing.

In FIG. 3 the attachment of the member 14 to the frame 12 together with the adjustable positioning of the two is shown. The cushioning member 16 is attached to the member 14 through the Velcro ® strips 72 as shown in FIG. 2. The member 14 is attached to the frame 12 through the tabs 30 formed in the member 14 which meet with the elongated slots 26 or 28 of the frame 12, see FIG. 4. Bolts 76 pass through the openings 74 in the member 14 and opening 75 in the frame 12 to firmly hold the member 14 to the frame 12. As shown in FIG. 4, the member 14 can be adjusted relative to the frame 12 by inserting the tab 30 into the elongated slot 26 or elongated slot 28. The positioning of the member 14 relative to the frame 12 can be adjusted to provide the adaptability of the support structure 10 according to the present invention for different uses of the disabled person support structure for use either as a wheelchair or for supports as will be discussed further.

FIG. 5 shows a side view of the adaptation of the preferred embodiment for use as a wheelchair. FIG. 5 shows that the propelling wheel 18 can be positioned along the elongated slots 38 to keep the occupant in an upright position as a standard wheelchair as shown in FIG. 1 or in a receded position as shown in FIG. 5 for wheelchair racing for instance. The propelling wheels 18 can be positioned into the slots 38 such that the entire assembly is lowered for speed propelling of the propelling wheel 18 while the member 14 is placed in its highest position by putting its tab 30 into the opening 26 in the frame 12. Thereby, the occupant of the support structure will be placed in a higher seating position while the entire support structure is low slung for faster propelling such as is useful when wheelchair racing. The interconnection of the propelling wheel 18 into the slots 38 of the frame 12 is better shown in FIG. 6.

As shown in FIG. 6, the member 14 is held in position into the frame 12. The hub 44 of the propelling wheel 18 is inserted into one slot 38. The hub 44 is then held in position by placing the washer 48 and the nut 50 onto the threaded portion 46 of the hub 44. The hub 44 can be inserted into any one of the plurality of elongated slots 38 to raise or lower the frame 14 relative to the ground. Further, the hub 44 can be adjusted along the length of the elongated slots 38 to raise or lower the back portion 60 of the member 14 to position the occupant of the support structure in an upright position or in a low slung position such as is shown in FIGS. 1 and 5.

FIG. 7 shows the member 14 placed in its highest upright position relative to the frame 12 as previously discussed. The propelling wheel 18 is shown fastened to the frame 12 at one of the plurality of holes 52 formed in the side 42 of the frame 12. The propelling wheel 18 has its hub placed into one of its openings and held in a similar manner as shown in FIG. 6. The selection of the correct hole 52 is for relative positioning to the occupant of the support structure. A bracket 80 is fastened to the frame 12 either by bolting or by connection to insertion into sockets 90, see FIGS. 13 and 14. The brackets 80 are connected to a plate 82, see also FIG. 9, which in turn supports a wheel 84 for pivoting to the plate 82. The wheel 84 could be one of the wheels 20 as shown in FIG. 5 for instance. A handlebar construction 86 is also pivotally mounted to the bracket 82. Means are provided to swivel the wheel 84 when the handlebars 86 are likewise pivoted In FIGS. 7 and 9, the pivoting means comprises an elongated brackets 88 and crank 91. Bracket 88 includes a pin 92 rigidly connected thereto. The interaction of the occupant of the support structure relative to the pivoting of the rear wheel can best be seen by referring to FIGS. 9, 10 and 11.

Figure 9:
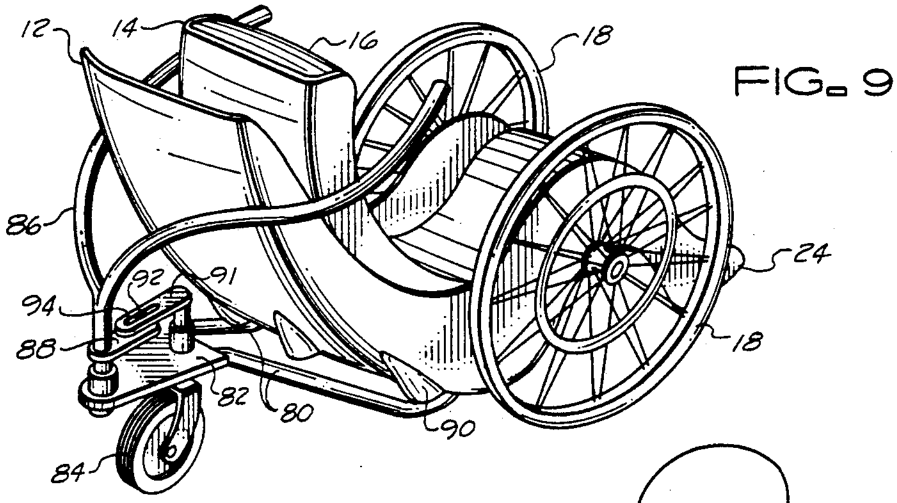
FIG. 9 shows a perspective view of the structure as shown in FIGS. 7 and 8.
Figure 11:
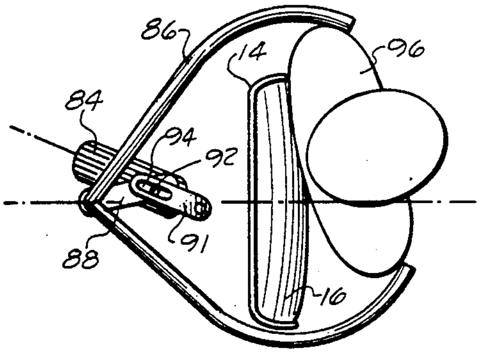
FIG. 11 shows the interaction of the steering structure of FIG. 9 as adapted to a human.
Figure 10:
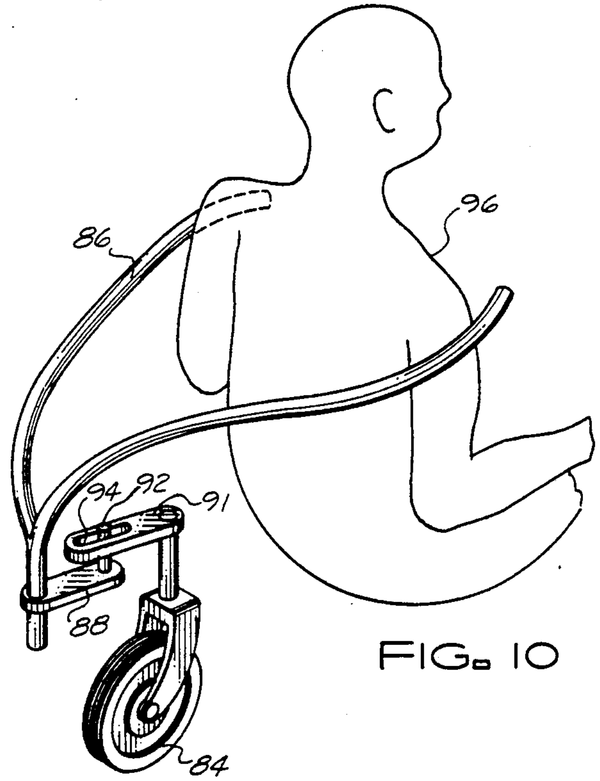
FIG. 10 shows the adaptability of the steering structure of FIG. 9 as controlled by an occupant.

Referring now to FIGS. 9, 10 and 11, the handlebars 86 pivot on plate 82 and rotate along the bracket 88. Pin 92 connected to the bracket 88 interacts with a slot 94 to move the crank 91 thereby pivoting the wheel 82. An occupant 96 seated against the cushion 16 of the member 14 operates the pivoting of the wheel 84 by his shoulders. Pivoting his shoulders moves the handlebars 86 which in turn will pivot the wheel 84 and thereby permit the turning and steering control of the sports racing structure according to the embodiment of the present invention shown in FIG. 7.

Figure 12:
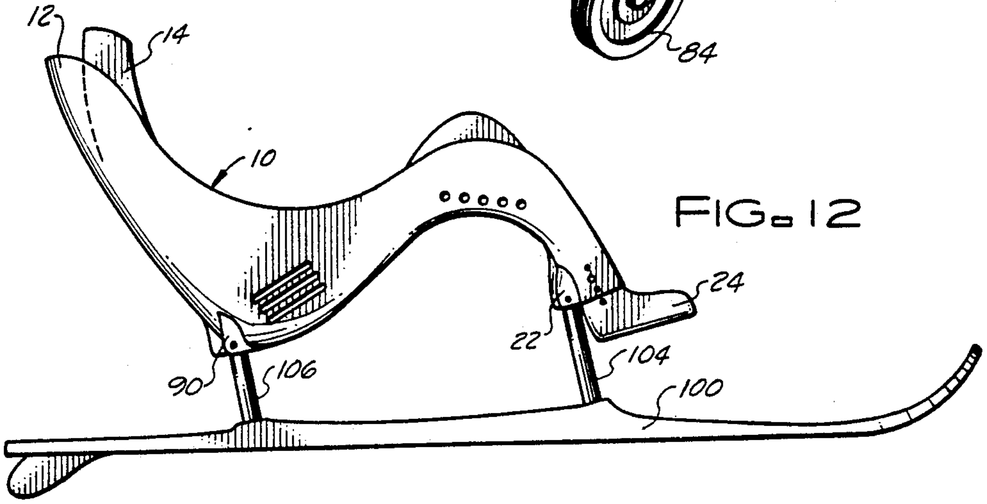
FIG. 12 shows the adaptability of the connected structure of the invention as shown in FIG. 2 as adapted for the sport of water skiing.

FIGS. 12 and 13 show the adaptability of the disabled person support structure for use with water-skis Referring to FIGS. 12 and 13, the support structure 10 is shown adapted to a pair of water-skis 100 and 102. Ski 100, for instance, includes a pair of rods 104 and 106. Rod 104 connects to the frame 12 through socket 22. Rod 106 connects to the frame 12 through socket 90. Socket 22 is the same socket that supported the wheel 20 as shown in FIG. 1. Socket 90 is the same socket that supported the bracket 80 as shown in FIG. 9. Likewise rods 108 and 110 of the ski 102 connect to the socket 22 and the socket 90 on the opposite side of the frame 12. Thus for two-ski water-skiing, the skis 100 and 102 can be fastened to the support structure 10 as shown in FIGS. 12, 13, and 14. The member 14 can be placed either in the lower or upper position as desired by the occupant. Further, snow-skis could be replaced for the water-skis 100 and 102 to provide a two ski snow-ski operation in the same manner as described for FIG. 13 above.

FIG. 15 shows another embodiment of the skis, either for snow or water, wherein the rods 104 and 108 of the forward portion of the skis 100 and 102 are interconnected by a connecting brace 112 and the rods 106 and 110 at the back portion of the skis 100 and 102 are connected by a brace 114. The braces 112 and 114 provide a stabilizing structure to assist in protecting the breaking away of a ski if a sideward force is applied by the water or the ground against the skis 100 and 102. These braces strengthen the skis and distribute the application of a side load to all of the sockets 22 and 90.

Further comfort can be added while skiing through the addition of shock absorber assemblies such as shown in FIGS. 16 and 17. In FIG. 16, a ski 120 includes shock absorber struts 122 and 124 which can absorb any sharp motion along the lengths of the struts 122 as can be applied by either rough water or the rough ground depending upon whether the ski 120 is to be used for either water or snow. Two standard tubular shock assemblies can be used such as shown in FIG. 17. A ski 126 has a shock absorber 128 pivotally mounted to the ski 126 for connection to a truss 130 which is likewise pivotally connected to the ski 126 at the rear portion of the ski. Another tubular shock assembly 132 interconnects the rear portion of the truss 130 into the socket 90. A rod bracket 134 is pivotally mounted to the truss 130 for connection to the socket 22.

With the ski assembly of FIG. 17, shocks are absorbed by the assembly in both the forward and upward direction to again provide for the comfort of the occupant of the support structure according to the present invention.

Further as shown in FIGS. 13 and 14, a socket 140 is shown formed in the center at the knee portion of the frame 12. A further socket 142 is shown positioned in the center at the seat portion of the frame 12 between sockets 90. The singular sockets 140 and 142 can be used for a single ski such as for instance the ski 120 and the ski 126 shown in FIGS. 16 and 17. The singular skis for either water or snow can be connected to the center sockets 140 and 142 for single ski operation.

The rods 104, 106, 108, and 110 can be fastened within the various sockets either by a snap lock in operation such as is standard in the locking of wheels to chairs or tables or the rods themselves can be fastened into the sockets by set screws to hold them firmly in place. Any means for interconnecting the wheels and rods to the various sockets can be used as is known by those skilled in the art.

In the operation of the disabled person support structure according to the present invention referring to FIG. 1 the seat cushion 16 is attached to the member 14 through the Velcro ® strips 70 and 72. The member 14 is positioned to have its tabs 30 placed into either elongated opening 26 or 28 depending upon the comfort of the occupant of the support structure. The member 14 is bolted and held in place as was discussed in FIGS. 3 and 4. The wheel structures for a standard wheelchair operation as shown in FIG. 1 and FIGS. 5 and 6 can be positioned according to the desires of the occupant. Either with the support structure supporting the occupant in a straight upright chair position or sloped in a backward position to provide lower air resistant for racing and ease of operation of the propelling wheels 18. The propelling wheels 18 can be inserted into any one of the plurality of slots and positioned any place along the length of the slots to change the height of the chair and to position the propelling wheel 18 in the desired position relative to the occupant of the chair.

The support structure can then be changed into a racing structure by positioning the propelling wheel 18 adjacent to the knees of the occupant in the holes 52. The position of the member 14 can be adjusted upward to raise the occupant of the support structure. The bracket 80 and the rear wheel 84 can be positioned in place at the seat structure of the frame 12. The handlebars 86 are then placed adjacent to the shoulders of the occupant whereby the occupant can pivot the rear wheel 84 to permit steering of the support structure when placed into this racing position for control of the wheelchair when racing. The same support structure can then be changed into another sporting vehicle by replacing the wheels with skis that are inserted into sockets of the frame through supporting rods. Either one or two water or snow-skis can be thereby mounted to permit the occupant of the support structure to enjoy the sport of skiing either over water or downhill on a snow covered mountainside. Further embodiments of the invention include a shock absorber assemblies is shown in FIGS. 16 and 17 for use with either the single or the dual water-skis for smoother operation and less jolting of the occupant of the support structure. Further, brackets can be added to the ski support structure for better support over use in rough terrain or over rough water.

The principles of the present invention have now been made clear in illustrated embodiments. There will be immediately obvious to those skilled in the art many modifications of the structure, arrangement, proportions, the elements, materials and components used in the practice of the invention. For instance, particular attaching means are shown for interconnecting the different pieces of the support structure such as the hub and nuts and bolts and slots as shown in the various Figs. Further, rods and sockets are shown for interconnecting the skis to the support structure. It should be evident that bolted brackets could be used while remaining within the spirit and scope of this invention. The appended claims are, therefore, intended to cover and embrace any such modifications within the limits only of the true spirit and scope of the invention.

What is claimed is:

1. A motion permitting support structure for adjustably supporting the body of a human user along a substantial portion of its length comprising:

a member having a generally chair-like form curved to conform to the body of the user with a continuous back, seat and upper leg support and upstanding sides following the curved form;

a frame generally curved to conform to the continuous back, seat and upper leg support sections of said member and including upstanding sides following its curved form;

means for adjustably fastening said member to a plurality of different positions relative to said frame;

a resilient cushioning means removably attached to said member and conformable thereto to comfortably support the user's body; and motion permitting means including wheel means removably and adjustably attachable to a plurality of positions on said frame for permitting relative motion to the sport structure relative to the ground surface, said wheel means including a steerable rear wheel attachable to said frame and a handlebar for controlling said steerable wheel.

2. A motion permitting support structure as defined in claim 1 wherein said wheel means includes a pair of propellable wheelchair wheels rotatable by a human occupying said member and a pair of relatively smaller pivotably and rotatably mounted wheels supporting said frame for movement relative to the ground surface.

3. A motion permitting support structure as defined in claim 1 wherein said motion means includes at least one water ski for supporting the support structure for a relative motion over a body of water.

4. A motion permitting support structure as defined in claim 3 wherein said motion means includes a pair of water skis.

5. A motion permitting support structure as defined in claim 1 wherein said motion means includes a set of snow-skis for supporting the support structure for relative motion over snow covered ground.

6. A motion permitting support structure as defined in claim 1 wherein said motion means is mounted by shock absorbing means to said frame of the support structure.

7. A motion permitting support structure as defined in claim 2 wherein said frame includes a plurality of elongated slots elongated along the length of said frame for mounting said wheelchair wheels at various heights and positions relative to the human occupying said member.

8. A motion permitting support structure as defined in wherein said wheel means includes a pair of wheelchair wheels, one mounted to each side of said frame adjacent the upper leg support section of said member assembly which includes said handlebar, said handlebar being a single smaller pivotable and rotatably mounted wheel, said single wheel pivotably mounted to a bracket fastened to said frame at the seat support section of said member, and further including a steering means pivotably attached to said bracket and adapted to pivot said single wheel.

9. A motion permitting support structure as defined in claim 8 wherein said handlebar faces forwardly toward said member and operable by the user while the user is facing away from said handlebar 10. A motion permitting support structure as defined in claim 1 further including a footrest height adjustably fastened to said frame for supporting the feet of the user occupying said member.

11. A motion permitting support structure as defined in claim 1 wherein said frame includes elongated slots, at least one placed at the back and at the seat section of said frame and wherein said member includes at least one tab for placement into said elongated slots to adjustably connect said member to said frame along its length.

12. A motion permitting support structure as defined in claim 1 wherein said frame includes a plurality of elongated slots in each side and adjustable to the seat section of said frame, a plurality of holes in each side and adjacent to a knee section of said frame wherein both said plurality of elongated slots and said plurality of said holes are adaptable to support a propellable wheelchair wheel.

13. A motion permitting support structure as defined in claim 2 further including sockets in said frame, at least one adjacent to each side and adjacent to the free end of said frame at substantially the leg section of said frame opposite to the back section of said frame, and at least one adjacent to each side and adjacent to the seat section of said frame.

14. A motion permitting support structure as defined in claim 13 further including additional downwardly facing sockets in said frame, one approximately centrally located between each pair of sockets attached at the leg section of said frame, one at each side, and one approximately located between each pair of sockets attached at the back section of said frame, one at each side.

15. A motion permitting support structure for disabled persons for multiple use for transportation and sports events, said motion permitting support structure comprising:

a member having a generally chair-like form curved to conform to the body of the disabled person with a continuous back, seat and upper leg support and upstanding sides following the curved form;

a frame generally curved to conform to the continuous back, seat and upper leg support sections of said member and including upstanding sides following its curved form;

means for adjustably fastening said member to a plurality of different positions relative to said frame;

a resilient cushioning means removably attached to said member and conformable thereto to comfortably support the disabled person;

motion permitting means including wheel mean for permitting relative motion of the support structure relative to the ground surface, said wheel means including a steerable rear wheel attachable to said frame and a handlebar for controlling said steerable wheel; and attachment means to removably and adjustably attach said motion permitting means to said frame, said attachment means including;

a plurality of elongated slots in said frame and elongated along the length of said frame at each side adjacent to the seat section of said frame, a plurality of holes in each side of said frame adjacent to a knee section of said frame, a plurality of sockets downwardly facing from the seat section of said frame, at least two adjacent the leg section of the frame, one on each side and at least two adjacent to the seat section, one at each side.

16. A motion permitting support structure as defined in claim 15 wherein said wheel means includes a pair of propellable wheelchair wheels and a pair of smaller pivotable and rotatable wheels, and wherein one of said wheelchair wheels is attached to said frame at each side through one of the plurality of elongated slots at each side and wherein one of said pivotable wheels is attached to said frame at each side to said one of said sockets located adjacent the leg section of said frame.

17. A motion permitting support structure as defined in claim 15 wherein said wheel means includes a pair of propellable wheelchair wheels said steerable wheel being a single smaller rotatable and pivotable wheel, and wherein one of said wheelchair wheels is attached to each side of said frame through one of the plurality of holes in each side adjacent to the knee section of said frame, and further including a pair of brackets supporting and connected to a plate at one end of both brackets, with the second end of each bracket attaching to said frame at the socket at each side of said frame adjacent to the seat section of said frame and including a steering assembly for pivoting said single wheel.

18. A motion permitting support structure as defined in claim 17 wherein said steering assembly includes said handlebar, said handle bar being pivotably mounted to said bracket and facing forward towards said member and operable by the disabled person occupying the support structure.

19. A motion permitting support structure as defined in claim 15 wherein said motion permitting means includes a pair of skis having at least a pair of socket attaching means depending upward from a top of each ski, one forward socket attaching means of each ski connecting to said attachment means comprising one of the plurality of sockets at each side adjacent the leg section of said member and one rearward socket attachment means of each ski connecting to said attachment means comprising one of the plurality of sockets at each side adjacent the seat section of said member.

20. A motion permitting support structure as defined in claim 19 wherein said socket attaching means depending from the top of each of said skis includes a pair of shock absorbing means.

* * * * *

UNITED STATES PATENT AND TRADEMARK OFFICE
CERTIFICATE OF CORRECTION

PATENT NO. : 5,116,067

DATED : May 26, 1992

INVENTOR(S) : John M. Johnson

It is certified that error appears in the above-identified patent and that said Letters Patent is hereby corrected as shown below:

Column 8,

In Claim 8, line 47, insert --claim 1-- before "wherein".

In Claim 8, line 49, delete "assembly which includes said handlebar, said handlebar" and insert --,said steerable wheel--.

In Claim 8, line 54, delete "further including".

In Claim 8, line 54, delete "means" and insert --assembly which includes said handlebar, said handlebar being--.

In Claim 9, line 60, insert --assembly-- after "handlebar".

Column 9,

In Claim 13, line 13, delete "2" and insert --12--.

In Claim 15, line 46, change "mean" to --means--.

Signed and Sealed this

Sixteenth Day of November, 1993

Attest:

BRUCE LEHMAN

*Attesting Officer*

*Commissioner of Patents and Trademarks*